Nov. 29, 1966  W. G. HOGUE  3,288,598
METHOD FOR RECOVERING METALS
Filed April 11, 1963  2 Sheets-Sheet 1

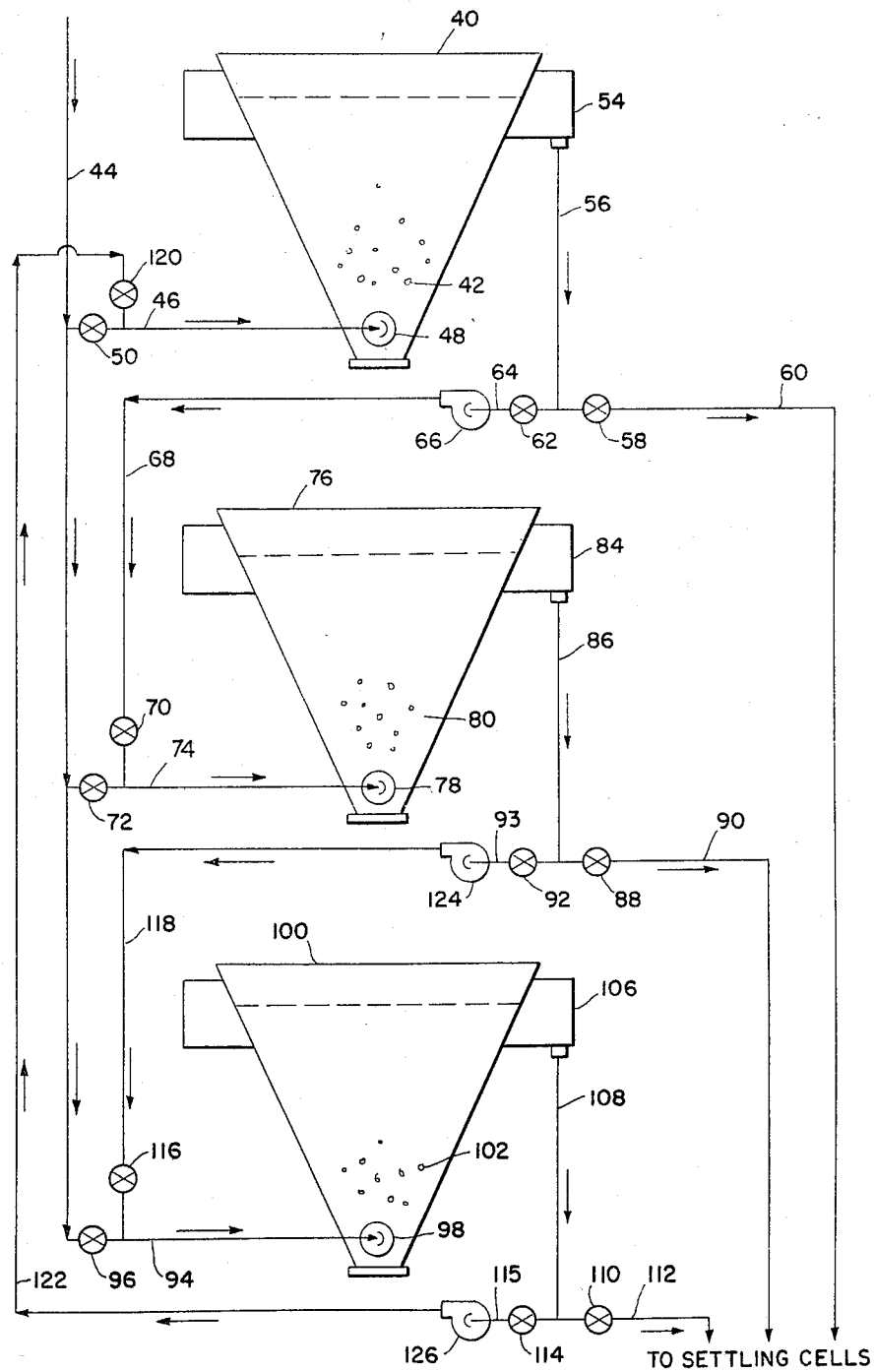

United States Patent Office 3,288,598
Patented Nov. 29, 1966

3,288,598
METHOD FOR RECOVERING METALS
William G. Hogue, Warren, Ariz., assignor to Phelps Dodge Corporation, New York, N.Y., a corporation of New York
Filed Apr. 11, 1963, Ser. No. 272,441
2 Claims. (Cl. 75—109)

This invention relates to a process and apparatus for the recovery of metals from metal bearing liquids based on their position in the electromotive force series of the elements relative to another metal. More particularly this invention relates to a process and apparatus for recovering copper from copper bearing solutions by the use of sponge iron.

The recovery of a metal from solutions by the cementation process comprises passing metal-bearing aqueous solutions, or pregnant liquors, over a second elemental metal which is above the first metal in the electromotive force series of the elements. In the process the second metal replaces the first metal in solution, and the first metal precipitates onto the surface of the remaining second metal and adheres to it, "blinding" the second metal causing the reaction to slow and finally cease. The process utilizes a surface reaction depending on contact between the pregnant liquor and the second metal for its continuation. However, as the first metal precipitates onto the surface of the second metal the active surface area is reduced; the pregnant liquor is increasingly prevented from contacting the second metal, and eventually the reaction ceases.

In prior art processes, iron is used in the form of shredded sheets to recover copper from solution. After cessation of the reaction the copper coated, shredded iron strips are then customarily removed from the reaction vessel and removed to equipment where the copper is stripped from the surface of the metal. The copper stripping is carried out in a typical process by placing the copper-coated iron into apparatus arranged for rotation and in which the metal is tumbled causing an abrading action that removes the copper from the surface of the iron. The iron and copper are recovered separately and the iron returned to the reaction chamber where it is exposed further to the pregnant liquors.

Because the reaction is a surface reaction, configurations of iron having large surface area per unit weight are especially useful for the reaction. Sponge iron, which is iron having a skeletal structure and very high surface to weight ratio, has been found especially useful in the cementation process recovery of copper. However, the copper coats the surface of the sponge iron in a similar way that it coats the surface of other forms of iron, and the reaction eventually ceases. It is necessary then in the known processes to transfer the copper coated sponge iron from the reaction vessel and remove the copper mechanically. The full speed of reaction of the sponge iron is never realized because of the handling step and also because from the time of initial contact until the time of cessation of the reaction the sponge iron surface becomes continually less available for reaction.

It is an object of this invention to provide a process and apparatus for recovering a first metal from solution by use of a second metal having a relatively higher position in the electromotive force series of the elements which facilitates separation of recovered first metal from unreacted second metal.

It is another object of this invention to provide an improvement to the cementation process for the recovery of copper from pregnant liquors in which cement copper is continuously removed from the surface of a sponge iron precipitant, eliminating the cessation of the reaction and the need for handling and equipment in order to separate recovered copper from unreacted sponge iron.

It is still another object of this invention to provide apparatus for the recovery of copper from pregnant liquors by a cementation process in which copper is continuously removed from the surface of sponge iron.

It is a further object of this invention to provide a process and apparatus for continuously removing copper from pregnant liquors by converting the copper into elemental form and gravimetrically recovering the elemental copper without interruption to the process.

Other objects will be apparent to those skilled in the art from reading the present disclosure taken in conjunction with the drawings, in which:

FIGURE 3 is a schematic flow diagram illustrating how multiple units of the apparatus of this invention may be used in sequence in the practice of this invention.

The objects of this invention are accomplished by the use of a reaction vessel which increases in horizontal cross-sectional area with increasing height. The vessel may be conical, trough shaped, etc. The vessel desirably has a foraminous conduit mounted inside and near its bottom by which pregnant liquors may be introduced into the vessel. Sponge iron particles are placed over the foraminous conduit in large excess of the stoichiometric quantities required to react with the copper contained in the pregnant liquor to be treated. The vessel has means for removal of spent liquor which may be merely in an open top over which the spent liquor overflows but which preferably is made up of a series of discharge ports in the wall of the vessel near the top of the sides.

Figure 1:
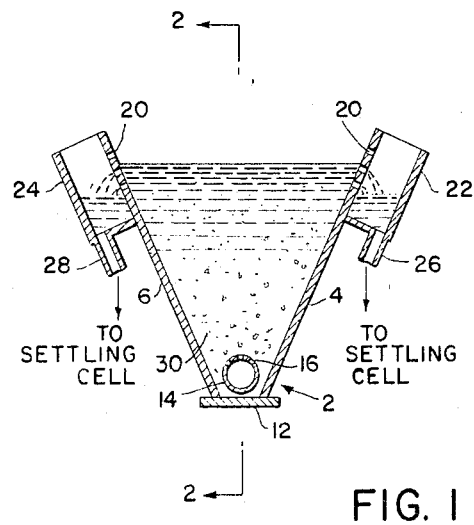
FIGURE 1 is a cross-sectional elevational view of an embodiment of the apparatus of this invention.
Figure 2:
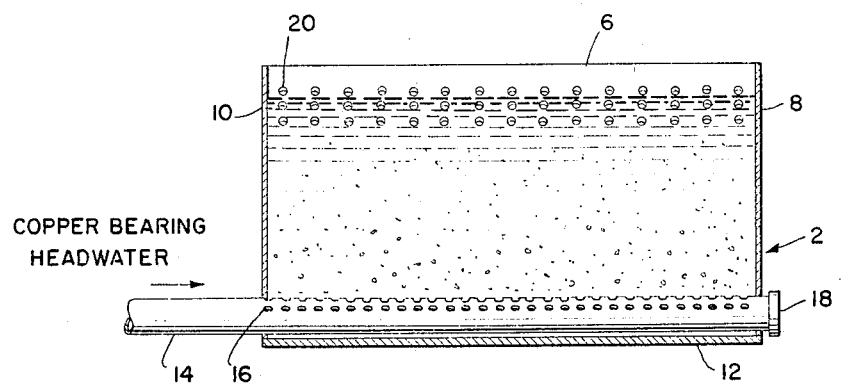
FIGURE 2 is a transverse sectional elevational view of the same embodiment of this invention taken generally along line 2—2 of FIGURE 1.

One embodiment of the apparatus of this invention is shown in FIGURES 1 and 2 and comprises V-trough shaped vessel 2 having sides 4, 6 which slant apart in an upwardly direction. The vessel is closed by ends 8, 10 which are joined to sides 4, 6. Mounted inside vessel 2 on bottom 12 is conduit 14 which contains holes 16 which, as shown, comprise three rows in the upward facing segment of conduit 14. Conduit 14 is connected at one end to a source of copper bearing headwater or pregnant liquor (not shown). The other end of the conduit 14 is closed by cap 18. Discharge ports 20 in sides 4, 6 permit the overflow of spent liquor into launders 22, 24 from which spent liquor containing fine particles of elemental copper is drained through conduits 26, 28 to a settling cell (not shown). Sponge iron particles 30 are disposed within vessel 2 and tend to settle around conduit 14. The particles have a high surface area to weight ratio.

In one method of practicing this invention pregnant liquor introduced into vessel 2 through conduit 14. As the pregnant liquor is discharged through holes 16 in conduit 14, it contacts sponge iron 30 and levitates the sponge iron particles placing them in turbulent suspension. Sponge iron 30 is maintained in constant agitation by the pregnant liquor. Some of the iron of the sponge iron replaces the copper in the pregnant liquor, and small particles of metallic copper precipitate onto the surfaces of the particles of remaining sponge iron. Because of agitation by the pregnant liquor, particles of sponge iron abrade each other with sufficient force to mechanically remove the metallic copper from the surface of the sponge iron. The particles of elemental copper are smaller than the particles of sponge iron and are carried out of vessel 2 along with the spent liquor from which the copper values have been wholly or partially removed. The spent liquor passes through ports 20 into launders 22, 24 and through conduits 26, 28 to settling cells where the small particles of copper settle out of the spent liquor and are recovered. The particles of sponge iron are larger than the particles of copper, and a higher velocity of solution is required in order to keep the larger sponge iron particles levitated than to keep the lighter copper particles levitated. Because of the increasing cross-sectional area of the vessel with increasing height, the velocity of the liquor decreases as it rises in vessel 2. Accordingly, sponge iron particles reach a height where they are no longer supported by the liquor and settle down toward the bottom of vessel 2.

An important function of the sloping sides of the reaction vessel is to force the heavier particles to settle downward in such a way that they eventually impinge upon the pregnant liquor stream thus increasing the abrading action. As the sponge iron is reduced in size it eventually reaches a particle size which will be supported by the spent liquor and be carried out with the copper. However, the amount of such iron contamination of the copper is negligible.

Surprisingly, the reaction has been found to proceed extremely rapidly. The sponge iron is extremely reactive with the copper-bearing liquors and may precipitate much of the copper from solution in less than about 30 seconds of contact. It is believed that the abrading action of the copper coated sponge particles which continually causes a maximum sponge iron surface to be presented to the pregnant liquor contributes to the high rate of reaction.

The more surface area of metallic iron that is available for reaction, the more quickly will the solution be depleted of its copper. Also, the more quickly the reaction may be made to occur, the smaller may be the plant design for a particular volume of pregnant liquor to be treated. Thus, a small reaction vessel may produce a large amount of cement copper.

The sponge iron may react with acid present to evolve gas, usually hydrogen. Vigorous evolution of such gas may aid materially in the convection of the sponge iron particles and separation of the metallic copper particles. It has also been found that periodic introduction of compressed gas, such as air, into foraminous conduit 14 substantially eleminates any tendency of the sponge iron particles to cake.

While the invention is described in terms of the replacement of copper in copper-bearing solutions by elemental iron, it is to be understood that the process may be used with any metals which occupy appropriate positions in the electromotive force series of the elements. For instance, silver, etc., may be recovered from solution by use of sponge iron. Conversely, aluminum or lead, zinc, iron shot, iron filings, etc., may be used to recover copper, silver, etc.

Furthermore, while the invention has been described in terms of a single stage of reaction, it is to be understood that a plurality of the reaction vessels may be used in series, series-parallel, and like arrangements.

FIGURE 3 illustrates how a plurality of reaction vessels may be used in sequence in the practice of this invention. Reaction vessel 40 is charged with partially reacted sponge iron 42. A full flow of pregnant liquor containing dissolved copper values is introduced through conduits 44, 46 into foraminous conduit 48. The amount of flow through conduit 46 may be controlled by valve 50. The pregnant liquor flows through the sponge iron particles and discharges into launder 54 from which it drains through conduit 56. Valve 58 in conduit 60 is closed, and valve 62 in conduit 64 is open. Therefore, the discharged pregnant liquor flows into pump 66 from which it is discharged into conduit 68. Valve 70 is open, and valve 72 is closed. Therefore, the liquor flows through conduit 74 into the reaction vessel 76 through formainous conduit 78.

Reaction vessel 76 is charged with relatively fresh sponge iron particles 80. The pregnant liquor passes up through sponge iron 80 and discharges into launder 84. The liquor which contains small particles of elemental copper drains from launder 84 through conduit 86. Valve 88 in conduit 90 is open, while valve 92 in conduit 93 is closed. The spent liquor flows through conduit 90 to a settling cell (not shown) where the elemental copper settles and is recovered.

At the same time a relatively small amount of strong pregnant liquor is introduced through conduits 44 and 94 controlled by valve 96 into foraminous conduit 98 in reaction vessel 100. Reaction vessel 100 is charged with nearly spent sponge iron 102. The pregnant liquor flows upward through sponge iron 102 and discharges into launder 106. The spent liquor drains from launder 106 through conduit 108. Valve 110 in conduit 112 is open while valve 114 in conduit 115 is closed. Therefore, the spent liquor flows through conduit 112 to a settling cell (not shown) where the metallic copper particles settle out and are recovered.

In the foregoing example, reaction vessel 76 contained relatively fresh sponge iron; reaction vessel 40 contained partially spent sponge iron, and reaction vessel 100 contained nearly spent sponge iron. These are the three stages through which the sponge iron passes in the course of the process. As the sponge iron in the three reaction vessels is used up in the process and successively replaced by fresh sponge iron, the relative position of each vessel in the process may be switched by manipulating the valves listed above, as well as valves 116 in conduit 118 and valve 120 in conduit 122. Similarly pumps 124 and 126 may be used to boost the velocity of partially reacted pregnant liquor as was pump 66. Other arrangements of the apparatus both in series and in parallel or combinations thereof will be apparent to those skilled in the art.

While a perforated conduit has been described as the means of introducing high velocity pregnant liquor, other devices may be substituted therefor, such as a screen, a constricted opening, etc. While the pregnant liquor is described as entering near the bottom of the reaction vessel, it may be introduced from other positions as long as agitation of the sponge iron particles is accomplished.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A process for recovering copper values from pregnant liquor comprising:
    (a) injecting pregnant liquor upwardly into a mass of sponge iron particles contained in a reaction vessel, at a sufficient velocity to effect motion of said sponge iron particles to cause them to abrade against one another;
    (b) changing the velocity of the upwardly moving stream of reacting liquor in an amount so that the copper precipitate particles formed are carried upward with the flowing stream which is substantially free from iron particles;
    (c) introducing the flowing stream containing said copper particles into a settling zone to effect separation of said copper particles.

2. A process for recovering copper values from pregnant liquor comprising:
    (a) injecting pregnant liquor upwardly into a mass of sponge iron particles contained in a reaction vessel with a sufficient velocity to effect motion of said sponge iron particles in a reaction zone and to cause them to abrade against each other and so mechanically remove small particles of elemental copper deposited on the sponge iron particles;
    (b) reducing the velocity of the upwardly moving stream of reacting liquor so that the relatively small copper particles are carried upward with the flowing stream and the relatively large iron particles settle so that the flowing stream becomes substantially free from iron particles and the copper particles are carried out of the reaction zone;

(c) introducing the flowing stream containing said copper particles into a settling zone to effect separation of said copper particles.

References Cited by the Examiner

UNITED STATES PATENTS

| | | | |
|---|---|---|---|
| 779,252 | 1/1905 | Baggaley | 75—109 |
| 860,661 | 7/1907 | Hendryx | 75—109 |
| 1,125,590 | 1/1915 | Nunez | 23—273.6 |
| 1,156,383 | 10/1915 | Towne et al. | 75—109 |
| 1,217,437 | 2/1917 | Gahl | 75—109 |
| 1,407,045 | 2/1922 | Thornhill | 75—109 |
| 1,856,661 | 5/1932 | Sherwood | 75—109 |
| 2,083,076 | 6/1937 | Mau | 23—311 |
| 2,130,278 | 9/1938 | Keyes | 75—109 |
| 2,716,600 | 8/1955 | Frick et al. | 75—109 |
| 3,092,490 | 5/1963 | Ednie | 75—26 |
| 3,154,411 | 10/1964 | Back et al. | 75—109 |

DAVID L. RECK, *Primary Examiner.*

N. F. MARKVA, *Assistant Examiner.*